LOSS IN PRODUCT REVENUE FROM LATERAL TEMPERATURE VARIATION

INVENTOR.
John W. Payne
BY
Andrew L. Jabornault
AGENT

United States Patent Office 2,846,368
Patented Aug. 5, 1958

2,846,368

CONVERSION METHOD AND APPARATUS

John W. Payne, Woodbury, N. J., assignor to Socony Mobil Oil Company, Inc., a corporation of New York Application February 25, 1953, Serial No. 338,769

6 Claims. (Cl. 196—52)

This invention is concerned with a method and apparatus for the conversion of gaseous reactants in the presence of a moving mass of granular contact material which may or may not exhibit catalytic properties with respect to the conversion reaction. It is particularly concerned with a method and apparatus for conducting such conversions which avoid any substantial temperature gradient across the contact material mass at any given level and thereby promote uniform conversion of the charge.

Typical of processes to which this invention may be applied is the catalytic conversion of high boiling mixed phase or vaporized hydrocarbons to lower boiling hydrocarbons by passing the hydrocarbon charge downwardly through a downwardly gravitating, substantially compact column of granular adsorbent catalytic material at temperatures of the order of 850° F. and upwards. Other exemplary processes are the thermal cracking, coking or visbreaking of a vaporized or mixed phase hydrocarbon charge by contact with a heated inert contact material and the catalytic reforming, desulfurization, isomerization, and the like, of a vaporized hydrocarbon with a granular catalyst.

Suitable contact material which is catalytic in nature may partake of the nature of natural or treated clays, bauxite, activated alumina or synthetic associations of silica, alumina, or silica and alumina, to which other substances, such as certain metallic oxides, may be added in small amounts for specific purposes. Contact material which is inert in character may partake of the form of refractory materials, such as zirkite, corhart or mullite, or it may partake of the form of stones or metallic particles or balls. In any case, it is desirable to maintain the contact material particles within the size range about 1 inch to 30 mesh and preferably about 3 to 14 mesh by Tyler standard screen analysis. The term "granular" is used in describing and claiming this invention to refer to particles of palpable particulate form, such as those of the above size ranges, as distinguished from finely divided powders, whether of regular shape, such as pellets, tablets or spheres, or irregular shape, such as obtained from grinding and screening operations.

In process of the aforementioned types it is usual to maintain a substantially compact column of contact material within a conversion zone with a gas plenum space thereabove in free communication with the upper surface of the column. Used contact material is removed from the lower section of the column to promote downward movement of the contact material granules through the column, and contact material is supplied to the upper surface of the column to replenish the supply therein at one or more points of restricted area while the gaseous reactant is supplied to the plenum space and passes therefrom into the upper end of the column. It has been found that where the gaseous reactant and the contact material supplied to the column are at substantially different temperatures, the above type system frequently results in an uneven conversion of the reactant because of cross-flow of the gaseous reactant and a layer of contact material flowing laterally over the surface of the reaction column. This may be best understood by considering as an example a hydrocarbon conversion system. In such a system it is normally necessary to introduce a vaporized hydrocarbon charge, which may be the total hydrocarbon charge or only a portion thereof, to the conversion zone at temperatures substantially below the optimum conversion temperature. This is necessary because the optimum conversion temperature is ordinarily above the temperature at which the vaporized charge would undergo thermal decomposition and it is highly desirable to avoid such thermal decomposition in the vapor feed preheater and transfer system. As a result, the heat required to raise the vapor charge from a temperature just below the temperature at which it will decompose to the desired optimum conversion temperature must normally be supplied by the incoming contact material. In addition, hydrocarbon conversion reactions are normally endothermic so that the heat required by the conversion reaction must also be supplied by the contact material. To supply this heat the contact material must be supplied to the conversion zone at temperatures substantially above the temperature at which the vaporized charge is supplied. Possibly the difference between the two may be as much as several hundred degrees. Where the contact material is supplied to the contact material column as a single central stream of restricted area, as is frequently the case, the upper surface of the column will assume the shape of a cone with apex at the bottom of the supply stream and sides at an angle equal to the angle of repose of the contact material. This angle of repose is normally within the range about 25 to 45 degrees with the horiontal and for most contact materials it is about 30 degrees. The vaporized hydrocarbon charge is supplied to a plenum space above this column which is in open communication with the upper surface of the column. Some of the contact material from the supply stream passes directly into the column in the area beneath the supply stream, but a major portion of the contact material flows outwardly from the supply stream as a layer of contact material flowing transversely over the upper end of the column to supply the portions of the column not lying directly beneath the supply stream. Contact material particles in this layer are flowing across the stream of cooler vaporized charge which is entering the upper end of the column. Thus, any given particle will be cooled by the constant contact with the vapor an amount depending on the distance the particle travels in the transverse layer before it enters the main body of the column which flows substantially unidirectionally downwardly. This results in a temperature gradient across the column beneath the transverse layer with a maximum temperature directly below the supply stream and a minimum at the outer edge of the column. The variation of temperature across the column may be as much as several hundred degrees. The same effect will occur when several widely spaced-apart supply streams are used and in any system where the contact material is supplied to a restricted area of the upper surface of the column, except that there may be several conical piles of contact material and several points of maximum and minimum temperature in the column. This temperature gradient results in varying degrees of conversion in various laterally spaced-apart regions of the column with probable over-conversion beneath the supply stream and under-conversion in regions beneath the outer edges of the conical pile. It might be thought that the temperature across the column would tend to become uniform shortly below its upper surface due to interchange of contact material across the column between high and low temperature regions. It has been found that the degree of such interchange is slight so that there is still a marked temperature gradient across the column at its lower end. It would also seem that there should be interchange of vapors across the column between high and low temperature regions, which would tend to minimize the uneven conversion in the two sections by subjecting any given unit of charge for a part of its passage through the column to high temperature contact material and for the remainder of its passage to lower temperature contact material. It has been found, however, that the expected interchange of vapors through the column does not occur to any great extent. It might further be expected that lateral heat exchange across the column would equalize the tempeartures thereacross in the lower section of the column but such heat exchange has been found to be slight.

Where the process is one in which the gaseous reactants are at a higher temperature than the contact material, the situation is reversed. The low temperature point is beneath the contact material supply stream while the high temperature point is near the outer edge of the contact material bed. The undersirable results are obviously the same, however.

Temperature gradients across the reaction bed have additional deleterious effects where the system is a catalytic hydrocarbon conversion process. The granular catalyst used here must be regenerated for re-use in the conversion zone by burning off the coke deposited thereon in the conversion zone. Where the temperature across the reaction bed is uneven, more coke will be deposited on the hot particles of catalyst than on the cooler particles. Solid catalyst normally cannot be heated beyond a certain temperature, typically about 1300 F., or they will be permanently damaged. Now if the catalyst having the most coke on it enters at the highest temperature as here, conditions in the regenerator will have to be adjusted to prevent this catalyst from overheating. But when this adjustment is made the parts of the kiln operating on the low coke-low temperature catalyst are not operating at full capacity. This results in an overall decrease in regenerator capacity from what would be obtained if the catalyst entered at a uniform temperature and coke level.

A further disadvantage of this temperature differential in catalytic conversion system reaction beds is that some of the cooler catalyst carries with it from the conversion zone partially cracked charge and other adsorbed material. This material may not even be removed by purging but upon entering the regenerator will vaporize and be carried out with effluent flue gas to appear as a smoke plume therein.

A major object of this invention is to provide a method and apparatus for the conversion of gaseous reactants which overcome the above-described difficulties.

Another object of this invention is to provide a method and apparatus for the conversion of a vaporized hydrocarbon charge uniformly to gaseous products.

Another object of this invention is to provide a method and apparatus for the conversion of a vaporized hydrocarbon charge to lower boiling products in the presence of a downwardly gravitating column of granular contact material which avoids overreaction of a portion of the charge, under-reaction of the remainder and a resultant low quality product.

These and other objects of the invention will be apparent from the following discussion of the invention.

This invention discloses a process and apparatus for the continuous conversion of a gaseous reactant in the presence of a moving mass of granular contact material wherein the contact material mass is maintained as a substantially compact, downwardly gravitating bed within a confined conversion chamber or zone. Contact material is supplied to the upper surface of the bed as at least one substantially compact stream of horizontal cross-sectional area only a minor fraction of the horizontal cross-sectional area of the bed. The upper surface of the bed is confined at angles with the horizontal greater than the angle of repose of the contact material by means of downwardly and outwardly sloping solid surfaces which form a hood over the upper surface of the bed. Gaseous reactant at a temperature substantially different from the temperature of the contact material is supplied to the upper surface of said bed through a plurality of spaced-apart passages in the solid confining surfaces. These passages have a total area which amounts to only a small fraction of the horizontal cross-sectional area of the contact material bed and conversion chamber. The gaseous reactant is passed downwardly through the bed to effect the desired conversion. The products of conversion are removed from the lower section of the conversion zone and spent contact material from the lower section of the bed. The term "gaseous" is used herein in describing and claiming this invention to refer to a material in the gaseous phase under the particular conditions of temperature and pressure involved, regardless of what may be its phase under normal atmospheric conditions.

This invention will be best understood by referring to the attached drawings, of which;

Figure 1:
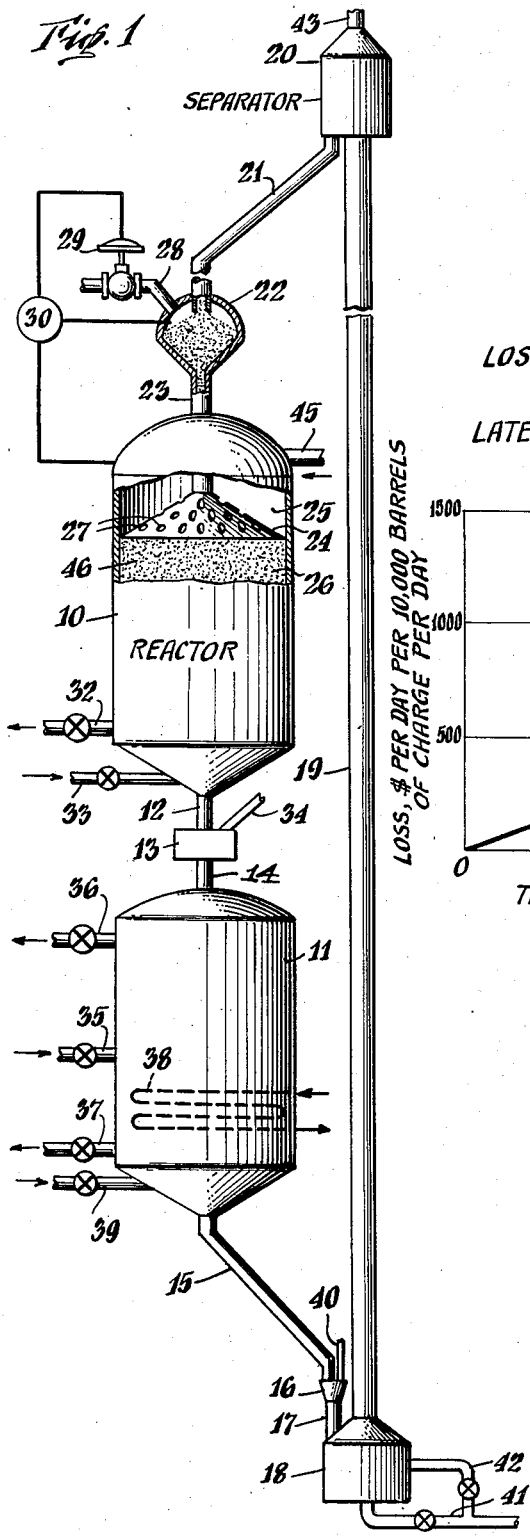
Figure 1 is a diagrammatic elevational view, partially in section, of a hydrocarbon conversion system employing this invention.

Turning to Figure 1, there is shown therein a reaction or conversion vessel 10 superimposed on a reconditioning vessel 11. Contact material withdrawal conduit 12 extends from the lower section of vessel 10 into a depressurizing vessel 13 and conduit 14 connects the depressurizer with the upper section of vessel 11. Conduit 15 extends from the lower end of vessel 11 into a vent chamber 16 and conduit 17 connects the vent chamber with a lift feed tank 18. Lift pipe 19 extends vertically upwardly from within lift tank 18 to an intermediate level in separator 20 positioned at a level above vessel 10. Conduit 21 extends from the lower section of the separator into seal chamber 22. Conduit or passageway 23 extends from the lower section of chamber 22 centrally and vertically into the upper end of vessel 10 and terminates in the upper section thereof. Connected to the lower end of 23 so as to receive contact material internally therefrom is a hood 24. The sides of hood 24 slope downwardly and outwardly from the lower end of conduit 23 to the walls of vessel 10 so that the hood takes the form of an inverted funnel-shaped member with spout connected to the lower end of conduit 23. Hood 24 defines a plenum chamber 25 above the hood and a conversion chamber 26 therebelow. Chambers 25 and 26 are out of communication with each other, except through a plurality of orifices or openings 27 which penetrate the solid surfaces of hood 24. Conduit 45 for the supply of vaporized hydrocarbon charge extends into plenum space 25.

In operation, granular contact material at a temperature suitable to supply a substantial portion of the heat required by the conversion reaction gravitates from the lower section of separator 20 through passage 21 into seal zone 22. In zone 22 a pressure of inert gas is maintained slightly above the pressure in the upper section of plenum space 25. This is accomplished by supplying an inert gas, such as steam or flue gas, to zone 22 through passage 28 at a rate controlled by diaphragm valve 29 in response to differential pressure controller 30. A downwardly gravitating, substantially compact bed or column of contact material 46 is maintained within conversion zone 26 in housing 10. A substantially compact feed stream of contact material, at a temperature suitable to supply at least a substantial portion of the heat required to heat the hydrocarbon charge to the desired conversion temperature and of horizontal cross-sectional area only a minor fraction of the horizontal cross-sectional area of column 46, is supplied to a restricted area of the upper surface of column 46 amounting to only a minor fraction of the horizontal cross-sectional area of bed 46. The remainder of the upper surface of 46 from the point of supply of the contact material is confined at angles with the horizontal equal to or greater than the angle of repose of the contact material by the downwardly diverging solid surfaces of hood 24. A substantially entirely vaporized hydrocarbon charge is supplied to plenum space 25 through passage 45 at a temperature substantially below the temperature at which contact material is supplied to column 46 through passageway 23. Vaporized charge passes into the upper surface of column 46 through orifices 27 which have a total area only a small fraction of the horizontal cross-sectional area of column 46. The vaporized hydrocarbon passes downwardly through the contact material column in conversion zone 26 and is converted to gaseous products. These products are removed through passage 32. Products may be disengaged from the contact material column by any one of a number of suitable arrangements, such as those shown in Simpson et al., U. S. Patent No. 2,336,641, or Bergstrom, U. S. Patent No. 2,458,498. The spent contact material is purged free of adhering hydrocarbons by inert purge gas, such as steam or flue gas, admitted through passage 33. Contact material is then passed downwardly through passage 12 into depressurizer 13 where the gas pressure is substantially relieved through vent 34. Spent contact material passes from 13 through passage 14 into the upper end of reconditioner 11. The particular reconditioner shown is a catalyst regenerator. The catalytic contact material, bearing a carbonaceous contaminant deposited thereon in the conversion zone, passes through zone 11 as a substantially compact column. A combustion supporting gas, such as air, is admitted centrally to said column through passage 35 and flows upwardly through the upper section of the column and downwardly through its lower section to burn off the contaminant deposit. Flue gas produced by the burning is removed through passages 36 and 37. The temperature of the contact material is maintained below the heat damaging level by means of cooling coils 38 through which a suitable cooling fluid is circulated. Other regenerator constructions than that shown may be used. For example, if the contact material is substantially inert in character, reconditioner 11 may take the form of a contact material heater. The reconditioned contact material is purged by inert purge gas admitted through passage 39 and gravitated through passage 15 to vent chamber 16 where inert gas is removed through vent 40. Contact material is then passed into lift tank 18 through passage 17. A suitable lift gas, such as air or flue gas, is admitted through conduits 41 and 42 and the contact material mixed therewith in tank 18 and transported thereby up lift pipe 19 to separator 20 where the lift gas is removed through passage 43 and contact material collects in the lower section of the separator to be returned to housing 10.

Figure 2:
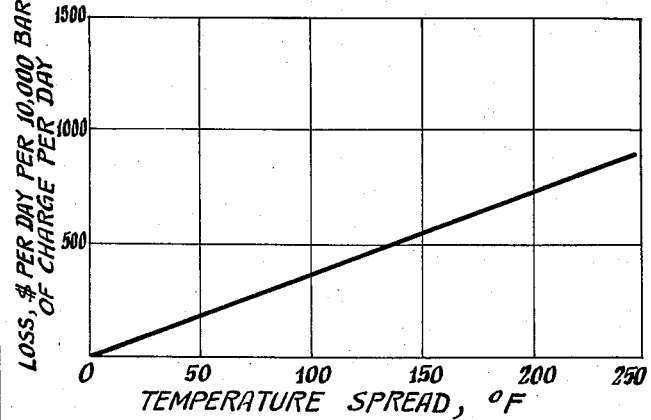
Figure 2 is a graph illustrating the savings in product revenue that may be effected by use of this invention.

Figure 2 illustrates that the effect of a temperature gradient across the reaction bed is not minor. Turning to that figure, it is readily apparent that the loss in revenue increases markedly with the temperature spread in the reaction bed. The temperature spread for use in the graph was determined at a level 2½ feet below the upper surface of the reaction bed of a catalytic hydrocarbon conversion system of the type previously described. Of course, the particular values shown in Figure 2 apply to only one set of operating conditions and one charge stock but similar values will be obtained for all other commercial operating conditions and charge stocks.

In this invention, contact between transversely flowing contact material and gaseous reactant is minimized to minimize the temperature gradient created thereby. Contact between transversely flowing contact material and gaseous reactant is not entirely avoided, since the gaseous reactant enters the upper surface of column 46 and the contact material is there flowing laterally to distribute itself across the bed from supply stream 23. However, in this invention, the size and number of orifices or openings 27 is such that the total area of all the orifices 27 is only a small fraction of the horizontal cross-sectional area of chamber 26 and bed 46, generally about 5 percent to 20 percent of the horizontal cross-section of conversion chamber 26, and contact material bed 46 therein, below the lower end of hood 24, and preferably about 7 percent to 15 percent of that area. Thus, the vapor charge only contacts a small fraction of the laterally flowing granules and an even smaller fraction of such granules more than once. A short distance below hood 24 the vapor charge contacts only contact material flowing in a generally downward direction with which it may come to a temperature equilibrium at a temperature level intermediate between the vapor and contact material temperatures. This equilibrium temperature will be substantially constant across the column because of the minimum contact between the vaporized charge and laterally flowing granules.

The confining surfaces of hood 24 should be at an angle equal to or slightly above the angle of repose of the contact material. Generally, the sides of the confining surfaces of hood 24 should be at an angle with the horizontal within the range about 0 to 15 degrees and preferably within the range about 0 to 5 degrees of above the angle of repose of the contact material. By maintaining the confining surfaces within these limits, the vapor charge may be made to enter only a small fraction of the upper surface of the contact material bed, but contact material from the bed will not flow out the holes through which the vapor is entering. Thus, for most commercially used contact materials the sides of the confining hood should make angles with the horizontal within the range about 30 to 45 degrees and preferably 30 to 35 degrees.

While the conversion vessel in this invention has been shown as being circular in horizontal cross-sectional shape, it may take other shapes, such as rectangular, hexagonal, etc. Hood 24 in any case should have the same horizontal cross-sectional shape as the vessel. The vaporized charge supplied to the conversion vessel plenum chamber should be substantially entirely vaporized. A liquid hydrocarbon charge may be supplied to the catalyst at a point below hood 24 or injected into feed leg 23 if desired. Orifices 27 should be substantially uniformly spaced around hood 24 with respect to the horizontal cross-section of column 46, so that there will be a uniform supply of gaseous reactant to the column. However, the orifices should be so arranged that a minimum amount of contact material in the transversely flowing layer is contacted by vapor. To accomplish this, it will be desirable in many cases to make orifices 27 in the shape of elongated slots.

When this invention is used for hydrocarbon conversions wherein the contact material supplies at least a major portion of the heat required, the contact material should be heated, before entering the conversion zone, to a temperature sufficient to supply the required amount of heat without falling below the desired conversion temperature. Where the contact material has a catalytic effect on the reaction, the temperature thereof on introduction should generally be within the range about 900° F. to 1250° F. Where the contact material serves merely as a heat carrier for a thermal cracking or coking reaction, its charging temperature may range as high as 1700° F. The hydrocarbon charge should be substantially entirely vaporized and should be introduced at a temperature within the range about 650° F. to 900° F. The ratio of contact material to vaporized charge introduced into the conversion zone should generally be within the range about 1.5 to 20 parts of contact material per part of oil by weight.

This invention should be understood to include all changes and modifications of the examples of the invention herein chosen for purposes of disclosure which do not constitute a departure from the spirit and scope of the invention.

I claim:

1. A continuous process for the conversion of gaseous reactants in the presence of a moving mass of granular contact material, which comprises: maintaining a downwardly gravitating, substantially compact bed of granular contact material within a confined conversion zone, supplying granular contact material as at least one confined substantially compact stream of horizontal cross-sectional area only a minor fraction of the horizontal cross-sectional area of said bed onto the upper surface of said bed, confining the upper surface of said bed at angles with the horizontal at least equal to the angle of repose of the contact material by means of downwardly and outwardly sloping solid surfaces from the point of supply of the contact material, supplying a gaseous reactant to the upper surface of said bed through a plurality of spaced-apart passages in said solid surfaces at a temperature substantially different from the temperature at which contact material is supplied to said bed, the total cross-sectional area of said passages being only a small fraction of the horizontal cross-sectional area of said bed, passing the gaseous reactant downwardly through the bed to effect the desired conversion, removing products of conversion from the lower section of the conversion zone and removing granular contact material from the lower section of said bed.

2. A continuous process for the conversion of a gaseous reactant in the presence of a downwardly gravitating, substantially compact column of granular contact material, which comprises: maintaining said column within a conversion zone in the lower section of a confined housing, maintaining a gas plenum space above said column in the upper section of said housing, supplying granular contact material at a temperature suitable to supply the heat required by the conversion reaction to a restricted area of the upper surface of said column, said area amounting to only a minor fraction of the horizontal cross-sectional area of said column, confining the upper surface of said column by means of downwardly and outwardly sloping solid surfaces which extend from the area of supply of contact material to said bed and make angles with the horizontal at least equal to the angle of repose of the contact material, said solid surfaces confining the upper surface of said column and said conversion zone out of communication with said plenum space except for a plurality of orifices which penetrate said solid surfaces at points uniformly spaced apart with respect to the column horizontal cross-section, the total area of all of said orifices being only a small fraction of the horizontal cross-sectional area of said column, supplying gaseous reactant to said plenum space at a temperature substantially below the temperature at which contact material is supplied to said column, passing the gaseous reactant from said plenum space into the upper surface of said column through said orifices, passing the gaseous reactant downwardly through said column to effect the desired conversion, removing the products of conversion from the lower section of the conversion zone, and removing contact material from the lower section of the column.

3. A continuous process for the conversion of a vaporized hydrocarbon charge to gaseous products in the presence of a downwardly gravitating, substantially compact column of granular contact material, which comprises: maintaining said column within a conversion zone in the lower section of a confined housing, supplying a confined stream of contact material at a temperature suitable to supply at least a major portion of the heat required by the conversion reaction centrally onto a restricted area of the upper surface of said column amounting to only a small fraction of the area of said upper surface, laterally confining the remainder of the upper surface of said column at angles with the horizontal within the range about 0 to 15 degrees greater than the angle of repose of the contact material by means of downwardly and outwardly sloping solid surfaces having a plurality of spaced-apart orifices therethrough, the total area of said orifices being only 5 percent to 20 percent of the horizontal cross-sectional area of said column below the lower ends of said solid surfaces, maintaining a gas plenum space above said bed in the upper section of said housing out of communication with said column and said conversion zone except through said orifices, supplying a vaporized hydrocarbon charge to said plenum space at a temperature substantially below the temperature at which contact material is supplied to said column, passing the vaporized charge into the upper surface of said column through said orifices, passing vaporized charge downwardly through said column to effect the desired conversion to gaseous products, removing gaseous products from the lower section of said zone, and removing granular contact material from the lower section of said zone.

4. An apparatus for the continuous conversion of gaseous reactants in the presence of a moving mass of granular contact material, which comprises in combination: an enclosed conversion chamber adapted to confine a downwardly gravitating, substantially compact bed of granular contact material, members defining a contact material supply passageway connecting into the upper section of said column, means for supplying contact material to the upper end of said passageway, a hood adapted to receive contact material internally from said passageway having downwardly and outwardly sloping sides at angles with the horizontal within the range about 30 to 45 degrees with the horizontal which connect on their upper ends to the lower end of said supply passageway and on their lower ends to the walls of said chamber and which have a plurality of spaced-apart openings therethrough, said openings having a total area amounting to only a small fraction of the horizontal cross-sectional area of said chamber, means for supplying gaseous reactants to the upper side of said openings at a temperature substantially different from the temperature at which contact material is supplied to said passageway, means for removing the products of the conversion from the lower section of said chamber, and means for removing contact material from the lower section of said chamber.

5. An apparatus for the conversion of gaseous reactants in the presence of a moving mass of granular contact material, which comprises in combination: an enclosed upright conversion vessel adapted to confine a substantially compact, downwardly gravitating column of granular contact material, a contact material supply conduit of horizontal cross-sectional area only a minor fraction of the horizontal cross-sectional area of said vessel extending into the upper end of said vessel and terminating in the upper section thereof, means for supplying granular contact material at a temperature suitable to supply a substantial portion of the heat required by the conversion reaction to the upper end of said conduit, an inverted funnel-shaped member with upper end connected to the lower end of said conduit and lower end connected to the walls of said vessel and with sides at an angle with the horizontal within the range about 30 to 45 degrees with the horizontal, said funnel-shaped member defining a gas plenum chamber in the upper end of said vessel above said member and a conversion chamber therebelow out of communication with said plenum chamber except through a plurality of uniformly spaced-apart orifices in said funnel-shaped member, which orifices have a total area amounting to only a small fraction of the horizontal cross-sectional area of said vessel, means for supplying a gaseous reactant to said plenum chamber at a temperature below the temperature at which contact material is supplied to said conduit whereby gaseous reactant passes from said plenum chamber to said conversion chamber through said orifices, means for removing the products of conversion from the lower section of said conversion chamber, and means for removing contact material from the lower section of the conversion chamber.

6. An apparatus for the continuous conversion of a vaporized hydrocarbon charge in the presence of a moving mass of granular contact material, which comprises in combination: an enclosed upright conversion vessel adapted to confine a substantially compact, downwardly gravitating column of granular contact material in its lower section, a contact material supply conduit of horizontal cross-sectional area only a minor fraction of the horizontal cross-sectional area of said vessel extending centrally into the upper end of said vessel and terminating in the upper section thereof, means for supplying granular contact material at a temperature suitable to supply the heat required by the desired conversion reaction to said conduit, a hood connected to the lower end of said conduit with downwardly and outwardly diverging sides at angles with the horizontal within the range about 30 to 35 degrees with the horizontal and extending to the walls of said vessel and adapted to receive contact material internally from said conduit, said hood defining a gas plenum chamber thereabove in the upper section of said vessel and a conversion chamber therebelow out of communication with said plenum chamber except through a plurality of uniformly spaced-apart orifices in said hood, which orifices have a total area amounting to about 7 percent to 15 percent of the horizontal cross-sectional area of said conversion chamber, means for supplying vaporized hydrocarbon charge to said plenum chamber at a temperature substantially below the temperature at which contact material is supplied to said conduit whereby vaporized charge will pass from said plenum chamber into said conversion chamber through said orifices, means for removing gaseous products of conversion from the lower section of said conversion chamber, and means for removing spent contact material from the lower end of said conversion chamber.

References Cited in the file of this patent

UNITED STATES PATENTS

| | | |
|---|---|---|
| 2,412,152 | Huff | Dec. 3, 1946 |
| 2,509,019 | Simpson et al. | May 23, 1950 |
| 2,565,811 | Hall | Aug. 28, 1951 |
| 2,685,343 | Permann | Aug. 3, 1954 |
| 2,689,211 | Findlay | Sept. 14, 1954 |